(12) United States Patent
Cutler

(10) Patent No.: US 6,202,599 B1
(45) Date of Patent: Mar. 20, 2001

(54) ANIMAL COLLAR

(76) Inventor: Hurse Adrian John Cutler, 102 Hartley Street, Portsmith, Cairns, Qld, 4870 (AU)

( * ) Notice: Subject to any disclaimer, the term of this patent is extended or adjusted under 35 U.S.C. 154(b) by 0 days.

(21) Appl. No.: 09/214,946

(22) PCT Filed: Jul. 16, 1997

(86) PCT No.: PCT/AU97/00448

§ 371 Date: Jan. 15, 1999

§ 102(e) Date: Jan. 15, 1999

(87) PCT Pub. No.: WO98/03057

PCT Pub. Date: Jan. 29, 1998

(30) Foreign Application Priority Data

Jul. 18, 1996 (AU) ..................................................... P01096

(51) Int. Cl.[7] ................................................. A62B 35/00
(52) U.S. Cl. ............................................................ 119/859
(58) Field of Search ..................... 119/718, 719, 119/721, 859, 863, 220

(56) References Cited

U.S. PATENT DOCUMENTS

| | | | | |
|---|---|---|---|---|
| 4,234,876 | * | 11/1980 | Murai | 119/859 |
| 4,898,119 | * | 2/1990 | Tsai | 119/859 |
| 5,515,033 | * | 5/1996 | Matarazzo | 119/859 |
| 5,575,242 | * | 11/1996 | Davis et al. | 119/721 |
| 5,818,354 | * | 10/1998 | Gentry | 119/220 |
| 5,952,925 | * | 9/1999 | Secker | 119/859 |

* cited by examiner

Primary Examiner—Peter M. Poon
Assistant Examiner—Elizabeth Shaw
(74) Attorney, Agent, or Firm—Renner, Otto, Boisselle & Sklar, LLP

(57) ABSTRACT

A warning device for animals, the device including an inertial sensor responsive to a rapid movement in a predetermined direction of an animal to which the device is fitted, the sensor providing a control signal in response to the movement in the predetermined direction, a control circuit responsive to the control signal and an output device for receiving a warning signal from the circuit and providing an audible warning output.

11 Claims, 3 Drawing Sheets

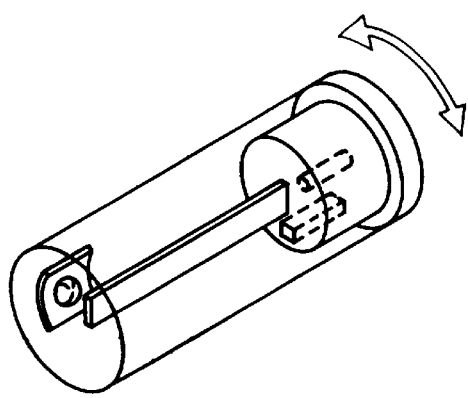
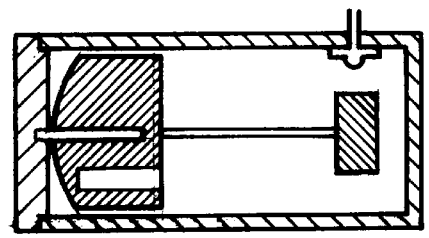
Fig. 5A　　　　　Fig. 5B
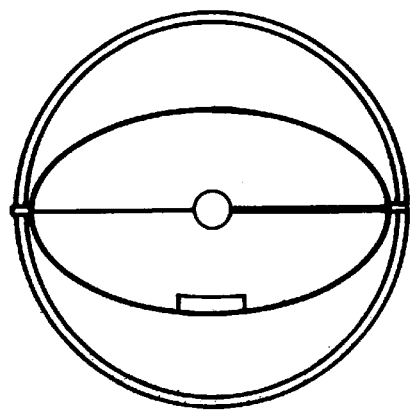
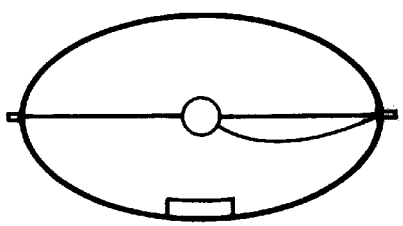
Fig. 6　　　　　Fig. 7
Fig. 9

ANIMAL COLLAR

THIS INVENTION relates to a warning device for animals. In particular, the invention concerns a collar for pets which provides at least an audible signal.

The invention will be described by way of example with reference to its use with domestic pets such as cats. It should be appreciated that the warning device of the invention may also be used in other situations.

Cats are endowed with strong hind quarters and have the ability to propel themselves in a forward direction over short distances with exceptional speed in a "launch action" to capture pray.

Domestic cats are responsible for the unwanted killing of wildlife such as birds, small mammals and reptiles. An attempt at providing prey with adequate warning of an impending attack by a cat has involved the fitting of a bell on a collar normally worn by the cat. The particular nature of the launch action in many instances renders such bells useless. The nature of the launch action over short distances is not physically capable of producing the mechanics necessary for an audible "pre-strike" alarm being caused by a bell. In addition, such bells during normal movement of the cat, produce constant ringing and this is not only annoying, but is not particularly threatening to wildlife and bells therefore are not effective as warning devices.

In most instances where cats attack and capture prey, the launch action is also an inherent part of the hunting pattern and this is one reason why the warning device of the invention is particularly effective.

The closer a cat can position itself to its intended prey without being noticed and before the launch action described above is carried out, the greater the chance of a kill. Strike distances vary and are typically 1.8 to 4.2 m. Cats draw on stalking skills to secure a suitable launch position. During the launch action, the cat endeavours to cover as much distance as possible before its prey detects the impending strike to thereby shorten the time available for the prey to take evasive action. Typically, a cat requires less than one second to cover the strike distance during a launch action.

Observations have shown that prey, such as birds, are not unduly perturbed by a ringing bell. Cat bells sound incessantly due to normal movement of the cat. Birds which share the same environment as the cat become familiar with the ringing bell sound and these sounds then become no cause for alarm.

It is an object of the present invention to provide a warning device which at least minimises the disadvantages referred to above.

According to one aspect, the invention provides a warning device for animals, the device including an inertial sensor responsive to rapid movement in a predetermined direction of an animal to which the device is fitted, the sensor providing a control signal in response to movement in the predetermined direction, a control circuit responsive to the control signal and an output device for receiving a warning signal from the circuit and providing an audible warning output.

The warning device may be worn by or otherwise be attached to an animal such as a cat. In one embodiment, the warning device is attached to or incorporated in a collar worn by the animal.

The warning device may be powered in any suitable way such as by a battery or a solar cell or dual powered by a battery and solar cell. The battery may be received by a battery housing on the collar.

The output device may consist of a piezoelectric transducer or crystal or a speaker. The output device may be mounted to the collar. A harsh intermittent tone may be produced although other sounds are not excluded.

The inertial sensor is responsive to rapid movement in a predetermined direction which typically coincides substantially with the direction of movement of the animal during a launch action. In this way, normal movement of the animal or movement of the animal in a direction other than the predetermined direction does not usually produce an alarm warning output from the warning device.

The sensor, as well as allowing the device to provide an audible warning output may also initiate a visual indication of rapid movement in the predetermined direction. Preferably the visual indication is provided by one or more lights. Preferably, the visual indication is provided by two lights which are illuminated in response to rapid movement in the predetermined direction. At night, the two lights may be seen by the intended prey as representing eyes and assist in allowing the prey to take evasive action. Regardless of whether the lights are recognised as eyes by the prey, the presence of one or more lights allow the prey to take bearings and effect an intelligent escape route.

The sensor may include a housing and an inertial member within the housing adapted for movement in a predetermined direction. The housing may have two electrical contacts with one coupled to the inertial member and the other being normally spaced and isolated from the inertial member. The member is movable into contact with the other contact to make a circuit.

Preferably, the sensitivity of the inertial member is adjustable so that its response to movement of the animal to which the device is fitted and its response to the direction of the movement may be varied.

Particular preferred embodiments of the invention will now be described by way of example with reference to the drawings in which:

FIGS. 5A and 5B show a perspective view and a longitudinal sectional view of an inertial sensor according to another embodiment;

FIG. 6 shows a view of another embodiment of inertial sensor;

FIG. 7 shows a diagrammatic view of part of the embodiment of the inertial sensor of FIG. 6;

Figure 1:
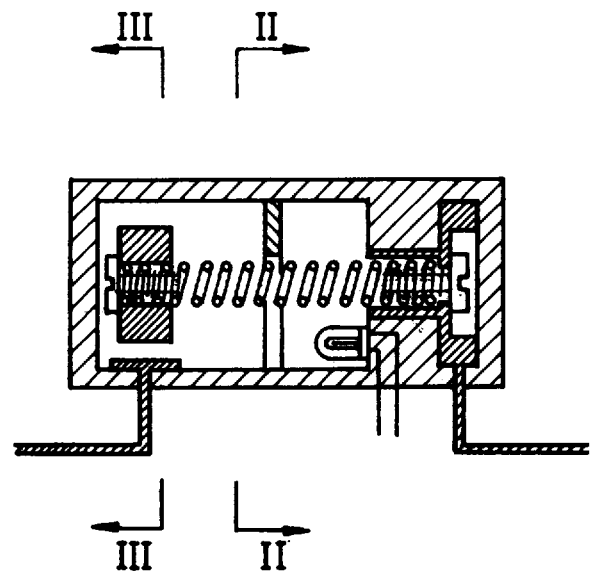
FIG. 1 is a longitudinal sectional view of an inertial sensor according to a first embodiment of the invention.
Figure 3:
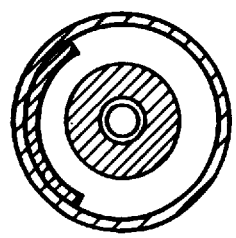
FIG. 3 is a transverse sectional view through the sensor along line III—III in FIG. 1.
Figure 2:
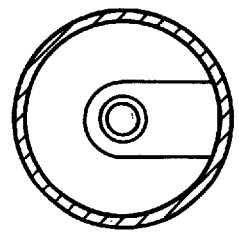
FIG. 2 is a transverse sectional view through the sensor along line II—II in FIG. 1.

As shown in FIGS. 1, 2 and 3, the inertial sensor 10 has a housing 11 and two opposed ends 12 and 13. End 13 forms one contact in an electrical circuit. Conductor 14 couples the end 13 to that circuit.

An inertial member 15 is connected to the end 13 by a fastener 16 and is in electrical contact with the end 13. In this embodiment member 15 comprises a spring. A weight 17 is carried by an end of the member 15 remote from the end 13.

The interior of the housing 11 carries an arcuate contact 20. Conductor 21 couples contact 20 to the electrical circuit mentioned above. The housing 11 isolates contacts 13 and 20 from one another.

A baffle or restrictor 25 is located within the housing 11 and between the ends of member 15 and functions to allow movement of member 15 in a predetermined direction to achieve contact between the weight 17 and contact 20. The baffle 25 has a slot 26 which allows for movement in that direction. The baffle may be mounted within the housing for rotational movement and be weighted so that the slot is present in a desired orientation for proper operation of the device.

The inertial sensor is mounted to a collar (as described below) so that movement of the member 15 is in a horizontal direction when a cat to which the warning device is fitted is in a crouched pre-launch position. Forces in a direction other than that allowed by the baffle are unlikely to activate the device.

The inertial sensor may be tuned or adjusted. Tuning may be achieved by varying the spring length, stiffness and the magnitude of the weight 17.

Figure 4:
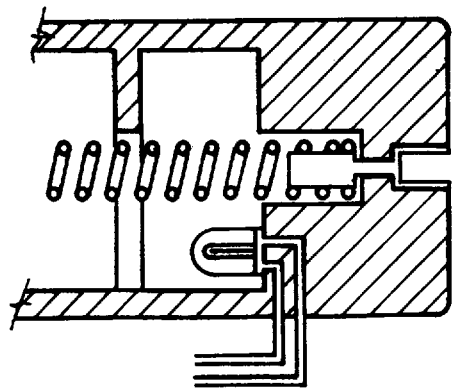
FIG. 4 is a partial longitudinal sectional view of an inertial sensor according to an alternative embodiment.

FIG. 4 shows a partial longitudinal view of an alternative inertial sensor 30. The sensor has two lights 31 (only one of which is shown in the drawing). These lights are activated in response to a launch action and may be seen by the prey as eyes and allow the prey to take bearings and effect an intelligent escape route. Inertial member 32 in the form of a spring is received in an end 33 of a housing 34. A socket 35 is formed in end 33 to allow for an electrical connection to be made to one end of the member 32.

FIGS. 5a and 5b show views of an inertial sensor according to another embodiment of the invention. The sensor 40 has a housing 41 with an end 42 and a contact terminal 43 adjacent the other end 44. End 42 is made of conductive material and has an inertial member 45 secured to it. Member 45 is in electrical contact with end 42. The sensitivity of the inertial member 45 may be fine tuned by having a tuning screw or the like extending from the housing and into contact with a location on the member 45 spaced from its free end.

Member 45, in the form of a strip is thin and flexible in a transverse direction in response to movement in that direction. The end 42 has a barrel 46 and the barrel may be rotated relative to the housing to allow the sensitivity of the sensor 40 to be adjusted. Rapid movement of the animal to which the device of the invention is subjected causes member 45 to flex and the free end of the member 45 may touch terminal 43 to make a circuit which is indicative of rapid movement of the animal in the predetermined direction.

The barrel 46 carries a weight 47 to assist in proper alignment of the sensor when in use.

FIGS. 6 and 7 show a diagrammatic transverse view of an alternative inertial sensor 50. In this embodiment, the sensor 50 has a housing 51 and a swivel mounted cradle 52 within the housing 51. The cradle 52 is able to pivot relative to the housing about pins 53, 54. Inertial member 55 is carried by an elastic band 55a and rapid movement in the predetermined direction causes member 55 to come into contact with contact terminal 56 carried by the cradle. Member 55 is electrically connected to pin 54 by a conductor 56a. In this way, a circuit is made between pins 53, 54 and terminal 56 to indicate a launch action by the animal to which the device of the invention is fitted.

Figure 8:
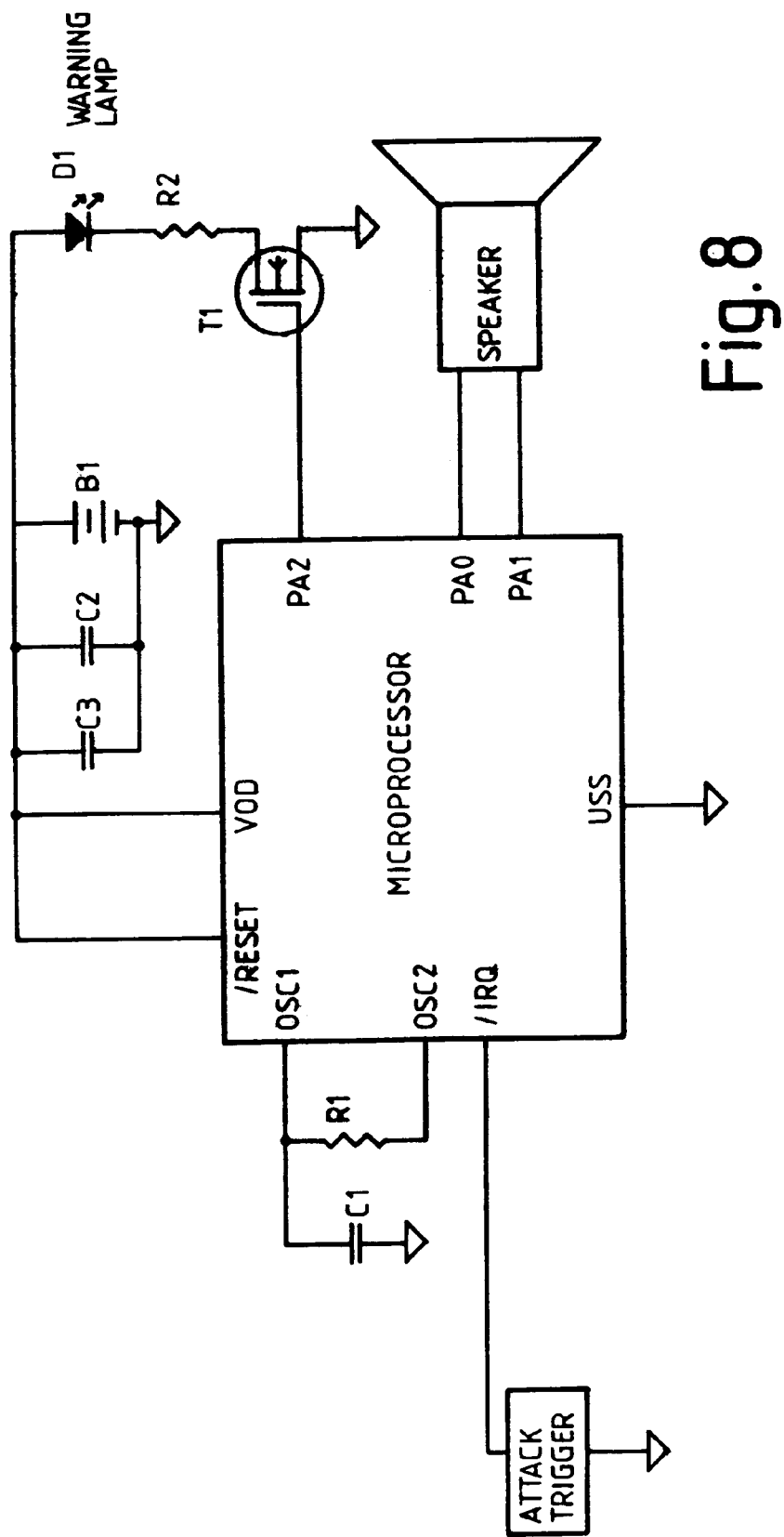
FIG. 8 shows a block diagram of a preferred control circuit for a warning device of the invention; and, FIG. 9 shows a view of a collar incorporating a warning device of an embodiment of the invention.
Figure 1:
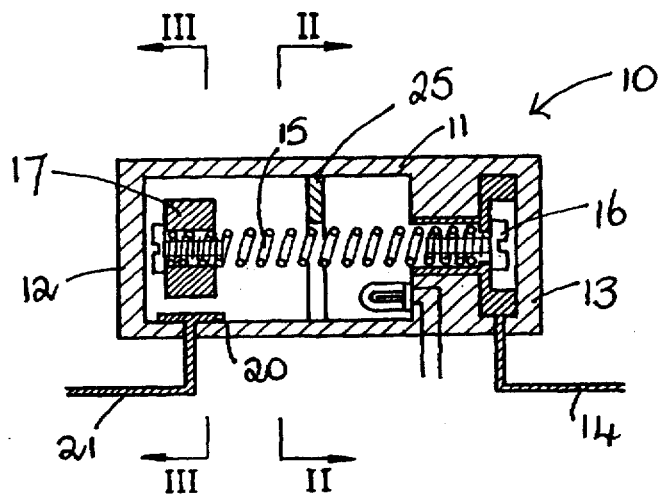
Figure 3:
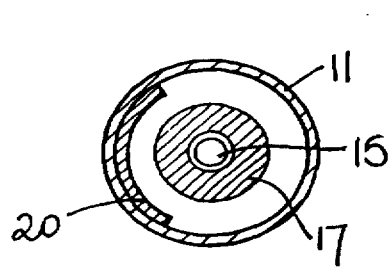
Figure 2:
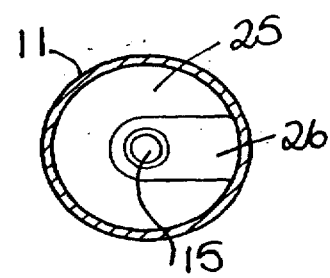
Figure 4:
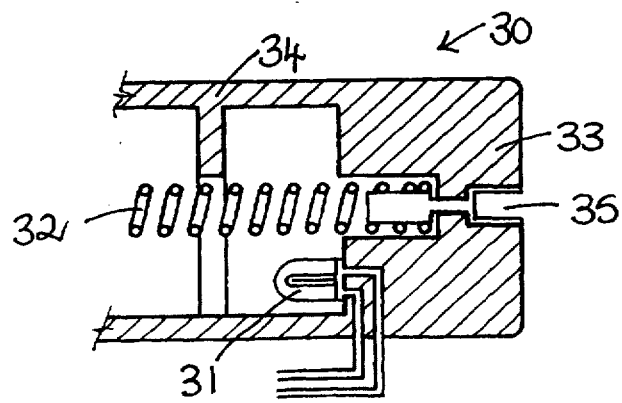
Figure 8:
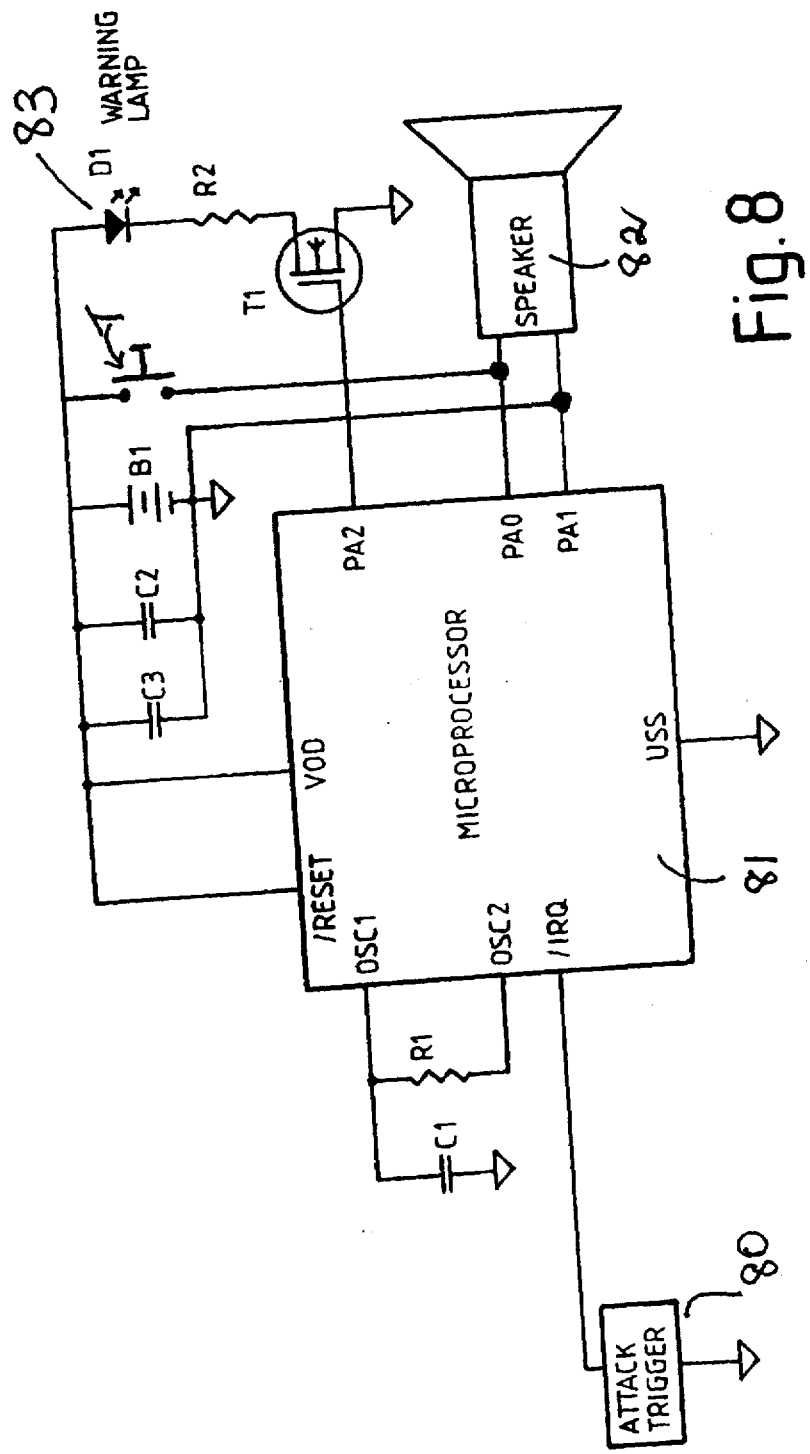

FIG. 8 is a block diagram of a control circuit according to an embodiment of the invention. The circuit shows an inertial sensor 80 coupled to a microprocessor 81. The microprocessor is programmed to provide an alarm signal in response to operation of sensor 80. The alarm signal is coupled to speaker 82 which provides an audible alarm. The microprocessor 81 also provides an output to transistor T1 for activating warning LEDs 83 or bulbs (only one of which is shown). The microprocessor may be programmed with a time out function to prevent multiple consecutive alarms from occurring within a specified elapsed time period. Self test switch T1 when closed causes the speaker to output a tone to test for proper speaker operation. The microprocessor causes the alarm signal to have a duration of about one second.

FIG. 9 shows a warning device 90, a collar 91 with a buckle 92. The collar carries an inertial sensor 93, a battery 94, a circuit 95 and a speaker 96. The collar may be attached to an animal and the device functions to provide an output in response to a launch action as previously mentioned. The inertial sensor is mounted to the collar at a location relative to the other parts so that it is at the centre of gravity relative to the collar and is self centering and presents the sensor at a desired orientation for proper operation. Instead of the separate components being mounted to the collar as shown in FIG. 9. These components may be present as a single unit mounted to a collar.

What is claimed is:

1. A warning device for animals, the device including an inertial sensor responsive to rapid movement in a predetermined direction of an animal to which the device is fitted whereby the movement of the animal in the predetermined direction causes the sensor to move, the sensor providing a control signal in response to movement of the sensor in the predetermined direction, a baffle through which the inertial sensor extends for allowing movement of the sensor only along the predetermined direction, a control circuit responsive to the control signal and an output device for receiving a warning signal from the circuit and providing an audible warning input.

2. The warning device of claim 1 wherein the control circuit includes a microprocessor programmed to provide a lock out interval to prevent the control circuit from outputting a further warning signal within a predetermined lock out time interval.

3. The warning device of claim 1 wherein the inertial sensor includes a housing, an inertial member within the housing with the member in electrical contact with a first contact, a second contact and the member being movable in response to rapid movement in the predetermined direction to make a circuit between the two contacts.

4. The warning device of claim 3 wherein the inertial member carries a weight at one end adjacent the second contact.

5. The warning device of claim 3 wherein the inertial member comprises a spring mounted within the housing.

6. The warning device of claim 5 wherein the baffle is located within the housing and having a slot for receiving the spring and for governing the movement of the spring in the predetermined direction.

7. The warning device of claim 3 wherein the inertial member comprises a thin elongate strip.

8. The warning device of claim 1 including at least one light activated by the warning signal from the control circuit.

9. The warning device of claim 1 in the form of a collar to which the inertial sensor, the control circuit and the output device are mounted.

10. The warning device of claim 9 including a power source carried by the collar for supplying power to the control circuit.

11. The warning device of claim 10 wherein the power source is a battery or a battery together with a solar cell for recharging the battery.

* * * * *

UNITED STATES PATENT AND TRADEMARK OFFICE
CERTIFICATE OF CORRECTION

PATENT NO. : 6,202,599 B1
DATED : March 20, 2001
INVENTOR(S) : Hurse Adrian, John Cutler It is certified that error appears in the above-identified patent and that said Letters Patent is hereby corrected as shown below:

The title page should be deleted to appear as per attached title page.

The sheets of drawings consisting of Fig. 1-9 should be deleted to appear as per attached title page Signed and Sealed this Twenty-seventh Day of November, 2001

Attest:

*Nicholas P. Godici*

NICHOLAS P. GODICI
*Attesting Officer*    *Acting Director of the United States Patent and Trademark Office*

United States Patent
Cutler

(10) Patent No.: US 6,202,599 B1
(45) Date of Patent: Mar. 20, 2001

(54) ANIMAL COLLAR

(76) Inventor: Hurse Adrian John Cutler, 102 Hartley Street, Portsmith, Cairns, Qld, 4870 (AU)

(*) Notice: Subject to any disclaimer, the term of this patent is extended or adjusted under 35 U.S.C. 154(b) by 0 days.

(21) Appl. No.: 09/214,946

(22) PCT Filed: Jul. 16, 1997

(86) PCT No.: PCT/AU97/00448

§ 371 Date: Jan. 15, 1999

§ 102(e) Date: Jan. 15, 1999

(87) PCT Pub. No.: WO98/03057

PCT Pub. Date: Jan. 29, 1998

(30) Foreign Application Priority Data

Jul. 18, 1996 (AU) .................................... PO1096

(51) Int. Cl.⁷ .................................... A62B 35/00
(52) U.S. Cl. .................................... 119/859
(58) Field of Search .................................... 119/718, 719, 119/721, 859, 863, 220

(56) References Cited

U.S. PATENT DOCUMENTS

| | | | |
|---|---|---|---|
| 4,234,876 | * 11/1980 | Murai | 119/859 |
| 4,898,119 | * 2/1990 | Tsai | 119/859 |
| 5,515,033 | * 5/1996 | Matarazzo | 119/859 |
| 5,575,242 | * 11/1996 | Davis et al. | 119/721 |
| 5,818,354 | * 10/1998 | Gentry | 119/220 |
| 5,952,925 | * 9/1999 | Secker | 119/859 |

* cited by examiner

Primary Examiner—Peter M. Poon
Assistant Examiner—Elizabeth Shaw
(74) Attorney, Agent, or Firm—Renner, Otto, Boisselle & Sklar, LLP

(57) ABSTRACT

A warning device for animals, the device including an inertial sensor responsive to a rapid movement in a predetermined direction of an animal to which the device is fitted, the sensor providing a control signal in response to the movement in the predetermined direction, a control circuit responsive to the control signal and an output device for receiving a warning signal from the circuit and providing an audible warning output.

11 Claims, 3 Drawing Sheets

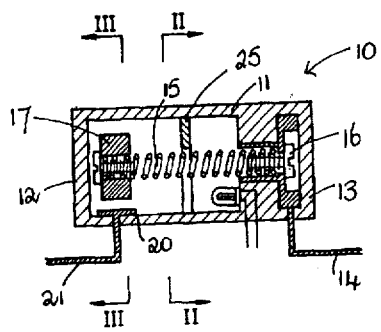

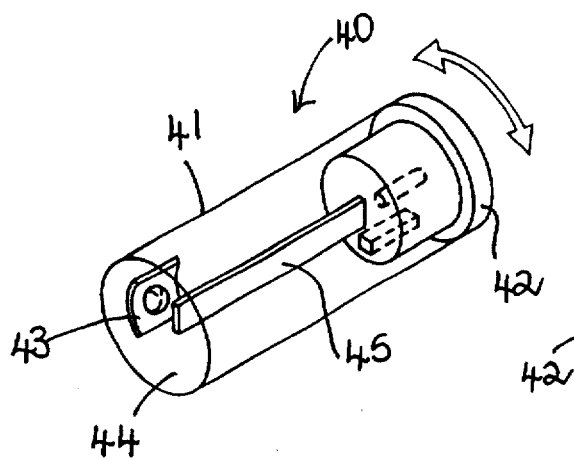
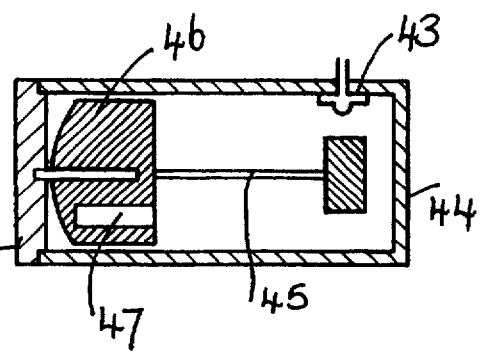
Fig. 5A  Fig. 5B
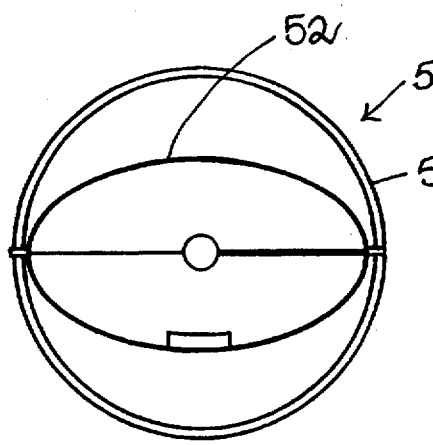
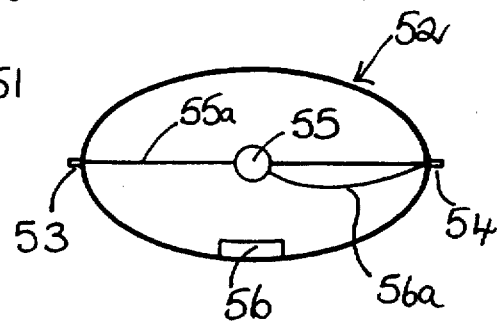
Fig. 6  Fig. 7
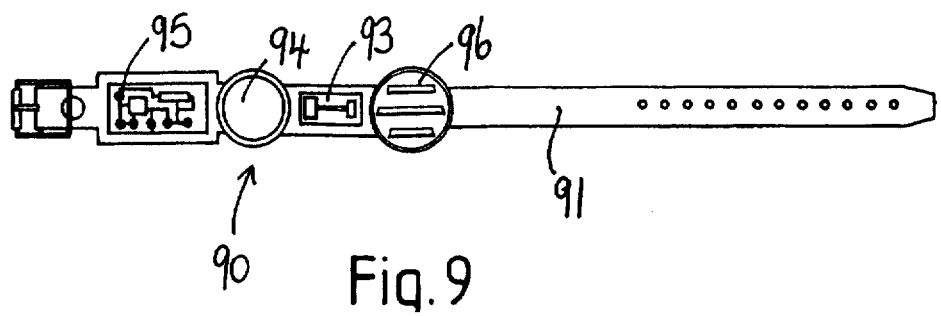
Fig. 9